United States Patent [19]

Miyabayashi et al.

[11] Patent Number: 5,066,757

[45] Date of Patent: Nov. 19, 1991

[54] ONE-CAN HEAT-CURABLE RESIN COMPOSITIONS AND PRECOATED METAL

[75] Inventors: Shigeaki Miyabayashi, Kobe; Takuro Sakamoto, Kawanishi; Hiroshi Kanai, Kimitsu; Joji Oka, Tokyo, all of Japan

[73] Assignee: Takeda Chemical Industries, Ltd., Osaka, Japan

[21] Appl. No.: 460,552

[22] Filed: Jan. 3, 1990

[30] Foreign Application Priority Data

Jan. 6, 1989 [JP]  Japan .................................. 1-001476

[51] Int. Cl.$^5$ .............................................. C08G 18/80
[52] U.S. Cl. ...................................................... 528/45
[58] Field of Search ............................................ 528/45

[56] References Cited

U.S. PATENT DOCUMENTS 4,562,714  1/1986  Tanaka et al. .......................... 72/46
4,725,661  2/1988  Miyabayashi .......................... 528/45
4,861,672  8/1989  Miyabayashi et al. ................. 428/458

*Primary Examiner*—Maurice J. Welsh
*Assistant Examiner*—Rachel Johnson
*Attorney, Agent, or Firm*—Wenderoth, Lind & Ponack

[57] ABSTRACT

A one-can heat-curable resin composition which comprises: (1) a polyester polyol having at least three functional groups; (2) an adduct of an epoxy resin with at least one member selected from the group consisting of an alkanol amine and a monovalent phenol; and (3) a blocked organic polyisocyanate or a blocked prepolymer having terminal NCO groups obtained by reaction of an organic polyisocyanate with an active hydrogen-containing compound, when used in the production of precoated metal, gives good coated plates, which can be advantageously used in manufacturing household electric appliances and so on.

6 Claims, No Drawings

ONE-CAN HEAT-CURABLE RESIN COMPOSITIONS AND PRECOATED METAL

FIELD OF THE INVENTION

This invention relates to a one-can heat-curable resin composition, with which coatings excellent in chemical-resistance or staining-resistance, in particular capable of withstanding such processing as bending, can be obtained. The resin composition of this invention is particularly useful as a coating composition for steel sheets in manufacturing precoated metal, among others.

BACKGROUND OF THE INVENTION

Precoated metal is generally manufactured by coating galvanized sheets or other metal plates with a coating composition, then fabricated into various desired shapes and submitted to an end use. For instance, it is used in manufacturing household electric appliances such as refrigerators, washing machines or electric stoves, fixtures including automatic vendors, office machines or food display cases, and the like metal products. Such precoated metal is expected to be used more widely in the future since it is more advantageous, with respect to coating process rationalization, uniformity in quality and saving in coating material consumption, among others, than coated metal plates products manufactured by the so called postcoating process comprising fabricating metal plates into complicated shapes and then applying a coating composition to the shaped matters.

The coating composition to be applied to metal plates for precoating is required to hold sufficient extensibility and adhesion to the metal surface so that the coating film can endure fabrication processes, such as bending, folding, embossing and drawing, since precoated metal is fabricated into shapes suited for the uses mentioned above after formation of the coated film. On the other hand, the final products obtained by using the precoated metal are required to have performance characteristics adapted for their respective end uses. For instance, building exterior materials, in particular fabricated portions thereof, are required to have high-level weather resistance and corrosion resistance. In the case of refrigerators and other household electric appliances, scuffing resistance and staining resistance are required. In addition, luster, water resistance, chemical resistance, moisture resistance and other durability characteristics are required, as the case may be.

For the above-mentioned uses, for example in household electric appliance manufacture, amino-alkyd resins, melamine-cured acrylic polyols and epoxy resins have been used. However, these resins have the drawback that their processability becomes extremely poor when their chemical-resistance and staining-resistance are improved.

A method of producing precoated metal which comprises applying a composition containing bis-(isocyanatomethyl)cyclohexane or an adduct thereof, in a blocked form, and polyol resin to metal plates and curing the composition by heating is known (Japanese Kokai Tokkyo Koho JP 56-89548). However, precoated metal obtained by this method cannot meet all the physical property requirements such as mentioned above.

Another known method (Japanese Kokai Tokkyo Koho JP 57-10375) comprises applying a composition containing an ethyleneimine-blocked isocyanate compound and a polyol resin to metal plates and curing the composition by heating. However, precoated metal obtained by this method also cannot meet all the physical property requirements such as mentioned above.

OBJECTS OF THE INVENTION

It has been a very difficult problem to improve film properties while balancing processability, staining resistance and hardness with one another. An object of this invention is to provide a resin composition capable of giving coating films which are well balanced among chemical resistance, staining resistance, processability and hardness and are excellent in other good film properties, and to provide precoated metal obtained by using the resin composition.

DETAILED DESCRIPTION OF THE INVENTION

As a result of their intensive investigations made in an attempt to find a resin composition giving coated films with good performance characteristics, especially in respect of chemical-resistance and stain-resistance, the present inventors found that combined use, as the polyol component, of a polyester polyol having at least three functional groups and an adduct of an epoxy resin with one or more kinds of alkanol amines and monovalent phenols leads to formation of coated films having good processability and high hardness, excellent in chemical resistance and stain resistance, especially in marking ink stain resistance and mustard stain resistance. Based on this finding, they have completed this invention.

More specifically, this invention is concerned with: 1. a one-can heat-curable resin composition which comprises: (1) a polyester polyol having at least three functional groups; (2) an adduct of an epoxy resin with at least one member selected from the group consisting of an alkanol amine and a monovalent phenol; and (3) a blocked organic polyisocyanate or a product of blocking of a prepolymer having terminal NCO groups obtained by reaction of an organic polyisocyanate with an active hydrogen-containing compound, and 2. a precoated metal obtained by coating a metal plate with a one-can heat-curable resin composition which comprises: (1) a polyester polyol having at least three functional groups; (2) an adduct of an epoxy resin with at least one member selected from the group consisting of an alkanol amine and a monovalent phenol; and (3) a blocked organic polyisocyanate or a product of blocking of a prepolymer having terminal NCO groups obtained by reaction of an organic polyisocyanate with an active hydrogen-containing compound; and curing said composition by heating.

The polyester polyol having at least three functional groups to be employed in this invention can be prepared by esterifying a dicarboxylic acid with a glycol and a polyol having at least three OH groups.

The dicarboxylic acid to be used in the production of said polyester polyol is, for example, an aliphatic one, such as succinic acid, succinic anhydride, adipic acid, azelaic acid, sebacic acid, dodecanoic acid, maleic acid, maleic anhydride, fumaric acid, itaconic acid or a dimer acid, or an aromatic and an alicyclic one, such as phthalic acid, phthalic anhydride, isophthalic acid, dimethyl isophthalate, terephthalic acid, dimethyl terephthalate, 2,6-naphthalenedicarboxylic acid, hexahydrophthalic anhydride, tetrahydrophthalic anhydride, dimethyl cyclohexanedicarboxylate, methylhexahydrophthalic anhydride, 3,6-endo-methylene-1,2,3,6-tetrahydro-cisphthalic anhydride or methyl-3,6-endomethylene-1,2,3,6-tetrahydro-cisphthalic anhydride.

As the glycol, there may be mentioned aliphatic ones, such as ethylene glycol, diethylene glycol, propylene glycol, 1,3-butylene glycol, 1,4-butylene glycol, dipropylene glycol, 1,5-pentanediol, 1,6-hexanediol, neopentyl glycol, neopentyl glycol ester of hydroxypivalic acid, triethylene glycol, 1,9-nonanediol, 3-methyl-1,5-pentanediol, 2,2,4-trimethyl-1,3-pentanediol, 2-ethyl-1,3-hexanediol, polycaprolactone diol, poly β-methylvalerolactonediol, polypropylene glycol, polytetramethylene ether glycol, polycarbonate diol, 2-n-butyl-2-ethyl-1,3-propanediol or 2,2-diethyl-1,3-propanediol, and alicyclic and aromatic ones, such as cyclohexanedimethanol, cyclohexanediol, xylylene glycol, bis(hydroxyethyl) terephthalate, 1,4-bis(2-hydroxyethoxy)benzene, hydrogenated bisphenol A, ethylene oxide adduct of bisphenol A and propylene oxide adduct of bisphenol A.

As the polyol having at least three OH groups, there may be mentioned, for example, glycerin, trimethylolpropane, trimethylolethane, 1,2,6-hexanetriol, pentaerythritol, diglycerin and ethylene oxide adducts, propylene oxide adducts and ε-caprolactone adducts with such polyols as initiators.

The esterification is conducted in a conventional manner by distilling off the condensate. However, since the product is polyfunctional, undesirable gelation may occur if the reaction is driven too fast. Generally, it is advisable to discontinue the reaction when the acid value has reached a value within the range of from 0.1 to 50, preferably from 1 to 20.

A practical example of the production method comprises charging a reaction vessel with dicarboxylic acid in an amount in excess of the number of moles of the glycol employed, allowing the reaction to proceed by distilling off condensation water while nitrogen gas is blown into the reaction system at temperatures ranging from 180° to 260° C. until the acid value reaches the given one to thereby obtain a polyester having COOH groups at both ends, then charging the reaction vessel with a polyol having at least three OH groups in an amount sufficient to convert said polyester to a polyester having terminal OH groups, allowing the reaction to proceed while distilling off condensation water, and discontinuing the reaction before the acid value exceeds 50, preferably when the acid value is in the range of from 1 to 20.

When a dicarboxylic acid is used in the form of dimethyl ester, the dimethyl ester is charged in excess as compared with the number of moles of the glycol and the condensate is distilled off under same conditions as mentioned above to give a polyester having methyl ester groups at both ends. Then, a polyol having at least three OH groups is charged and the ester exchange is conducted under the same conditions as mentioned above to give a polyester polyol.

When an acid anhydride is used in combination, a dicarboxylic acid is first charged in an amount smaller in the number of moles as compared with the glycol used, and the condensate is distilled off under the same conditions as mentioned above to give a polyester having OH groups at both ends. The dicarboxylic anhydride is then added. Ring opening of said anhydride leads to formation of a polyester having COOH groups at both ends. Then, a polyol having at least three OH groups is charged, and the reaction is performed in the same manner as mentioned above to give a desired polyester polyol.

The polyester polyol to be used in accordance with this invention should preferably have 3 to 7 functional groups, more preferably 4 to 6 functional groups, a number average molecular weight of 600 to 3500 and a hydroxyl value of 80 to 460. When the number or functional groups is less than 3, the cured coating film will have a low hardness and poor chemical resistance.

When the number of functional groups exceeds 7, the coating film may have decreased flexibility. When the number-average molecular weight is below 600, the cured coating film will have an obscured luster. When the said molecular weight is more than 3,500, the coating composition will become highly viscous, whereby problems may arise with respect to coating workability causing, as the case may be, poor coating appearance. When the hydroxyl value is less than 80, the cured coating film may have poor chemical resistance and stain resistance. When the hydroxyl value exceeds 460, the flexibility of the cured coating film may become poor.

The adduct of an epoxy resin with one or more kinds of an alkanol amine and a monovalent phenol, namely another polyol component to be used in this invention, is, for example, the product obtained by causing, by per se known means, e.g. Japanese Kokai Tokkyo JP 61-231019, one or more kinds of an alkanol amine and a monovalent phenol to add to an epoxy resin of the following general formula. The hydroxyl value of this polyol component ranges from about 100 to about 600.

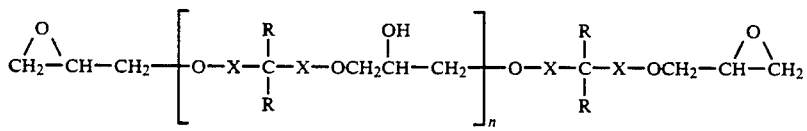

[wherein X stands for a phenylene or cyclohexylene group, which may optionally be substituted with halogen; R stands for H or methyl group; and n denotes 0 to 12.0]

Among the epoxy resins having the above general formula, those in which X is p-phenylene and n is 2 to 9 are preferred. The halogen is, for example, bromine or chlorine. The number of this substituent is usually about 1 to 3, and the position may be either at the phenylene group or the cyclohexylene group.

Examples of the alkanolamines include monoalkanolamine such as monoethanolamine, N-methylethanolamine, N-methylisopropanolamine, N-ethylethanolamine, N-benzylethanolamine, etc., dialkalnolamine such as diethanolamine, dipropanolamine, diisopropanolamine, dibutanolamine, di-2-hydroxybutylamine, di-2-hydroxyoctylamine, etc. Among them, diethanolamine or diisopropanolamine is preferred. The amount of alkanolamine to be added ranges from about 0.8 to about 1.8 mol. relative to 1 equivalent of the epoxy group.

As the monovalent phenol, there may be mentioned phenol, cresol, isopropylphenol, isobutylphenol, nonylphenol, xylenol, di-s-butylethyl, di-tert-butylphenol, etc., and especially preferable ones are isopropylphenol or isobutylphenol of alkyl phenols. The amount of the monovalent phenol to be added ranges from about 0.8 to about 1.2 mol. relative to one equivalent of the epoxy resin.

The above-mentioned alkanolamines and monovalent phenols may be used one or more kinds of them, respectively, or may be used together. The adduct of such epoxy resin having at least one alkanolamine and monovalent phenol is used in an amount of about 10 to 70 weight %, preferably within the range of about 10 to 60 weight % by weight, on the polyol component basis. When said adduct is used in an amount less than 10% by weight on said basis, the stain resistance, in particular the resistance to mustard stain, may be decreased. When it is used in an amount exceeding 70% by weight, the mustard resistance will be satisfactory but the processability may be markedly lowered.

As the blocked compounds to be used in this invention, there may be mentioned products of blocking of compounds having at least two NCO groups, for example, aliphatic diisocyanates, such as trimethylene diisocyanate, tetramethylene diisocyanate, hexamethylene diisocyanate, pentamethylene diisocyanate, 1,2-propylene diisocyanate, 2,3-butylene diisocyanate, 1,3-butylene diisocyanate, 2,4,4- or 2,2,4-trimethylhexamethylene diisocyanate, dodecamethylene diisocyanate, 2,6-diisocyanatomethyl caproate, etc., cycloalkylene diisocyanates, such as 1,3-cyclopentane diisocyanate, 1,4-cyclohexane diisocyanate, 1,3-cyclohexane diisocyanate, 3-isocyanatomethyl-3,5,5-trimethylcyclohexyl isocyanate, 4,4'-methylenebis(cyclohexyl isocyanate), methyl-2,4-cyclohexane diisocyanate, methyl-2,6-cyclohexane diisocyanate, 1,2-bis(isocyanatomethyl)cyclohexane, 1,4-bis(isocyanatomethyl)cyclohexane, 1,3-bis(isocyanatomethyl)cyclohexane, trans-cyclohexane-1,4-diisocyanate, etc., aromatic diisocyanates, such as m-phenylene diisocyanate, p-phenylene diisocyanate, 4,4'-diphenyl diisocyanate, 1,5-naphthalene diisocyanate, 4,4'-diphenylmethane diisocyanate, 2,4- or 2,6-tolylene diisocyanate, 4,4'-toluidine diisocyanate, dianisidine diisocyanate, 4,4'-diphenyl ether diisocyanate, etc., araliphatic diisocyanates, such as $\omega,\omega'$-diisocyanato-1,3-dimethylbenzene, $\omega,\omega'$-diisocyanato-1,4-dimethylbenzene, $\omega,\omega'$-diisocyanato-1,4-diethylbenzene, $\alpha,\alpha,\alpha',\alpha'$-tetramethyl-m-xylylene diisocyanate, $\alpha,\alpha,\alpha',\alpha'$-tetramethyl-p-xylylene diisocyanate, etc., triisocyanates, such as triphenylmethane-4,4',4''-triisocyanate, 1,3,5-triisocyanatobenzene, 2,4,6-triisocyantotoluene, $\omega$-isocyanatoethyl-2,6-diisocyanatocaproate, etc., and tetraisocyantates, such as 4,4'-diphenylmethylmethane-2,2',5,5'-tetraisocyanate, as well as products of blocking of prepolymers having terminal NCO groups obtained by reacting such polyisocyanates as mentioned above with an active hydrogen-containing compound.

Since precoated metal is required to have weather resistance, the use is preferred of such isocyanate compounds as hexamethylene diisocyanate, 3-isocyanatomethyl-3,5,5-trimethylcyclohexyl isocyanate, 1,4-bis(isocyanatomethyl)cyclohexane, 1,3-bis(isocyanatomethyl)cyclohexane, 4,4'-methylenebis(cyclohexyl isocyanate), $\alpha,\alpha,\alpha',\alpha'$-tetramethyl-m-xylylene diisocyanate, etc. among the NCO-containing compounds mentioned above.

The prepolymer having terminal NCO groups is prepared by reacting the above-mentioned monomeric isocyanate compound with an active hydrogen-containing compound under conditions such that the isocyanate group is in excess.

The active hydrogen-containing compound to be used in producing said prepolymer includes low-molecular-weight polyols, for example dihydric alcohols, such as ethylene glycol, propylene glycol, 1,2-butylene glycol, 1,3-butylene glycol, 1,6-hexanediol, diethylene glycol, dipropylene glycol, neopentyl glycol, neopentyl glycol ester of hydroxypivalic acid, triethylene glycol, hydrogenated bisphenol A, xylylene glycol and 1,4-butylene glycol, trihydric alcohols, such as glycerin, trimethylolethane, trimethylolpropane and 1,2,6-hexanetriol, and tetrahydric alcohols, such as pentaerythritol, and high-molecular-weight polyols, for example polyether polyols, such as propylene oxide or ethylene oxide adducts of the above-mentioned polyols, polyester polyols prepared by reacting the above-mentioned low-molecular-weight polyols with dicarboxylic acids, and fatty acid modifications of such polyester polyols, epoxy resins having OH groups, and lactones, and epoxy resins modified with one or more kinds of alkanolamines and phenols.

These polyols may be used either singly or in combination.

The prepolymer formation reaction is generally carried out in an NCO/OH equivalent ratio of about 2.0, preferably about 4–8, at 40°–140° C., preferably 70°–100° C. If necessary, the unreacted monomeric isocyanate can be removed by a conventional method, for example by film evaporation or extraction. For this reaction, there may be used organic metal catalysts, such as tin-, lead-, zinc- and iron-based ones. As the prepolymer, there may be mentioned biuret compounds obtained by reacting water or a low molecular amine, such as ethylenediamine, with an excess of the above-mentioned monomeric isocyanate, allophanate compounds obtained by reacting the above-mentioned low-molecular-weight or high-molecular-weight polyol with an excess of the monomeric isocyanate and, further, organic diisocyanate dimers and trimers obtained by subjecting a monomeric diisocyanate to reaction in the presence of a catalyst known as capable of catalyzing the dimerization or trimerization of organic diisocyanate.

The blocked monomeric isocyanate or blocked prepolymer mentioned above can be prepared by reacting the corresponding monomeric isocyanate or prepolymer with a blocking agent by a conventional method. The blocking agent for use in this reaction may be any blocking agent known as usable for blocking isocyanates, for example a phenol, a lactam, an active methylene compound, an alcohol, a mercaptan, an acid amide, an imide, an amine, an imidazole, a urea, a carbamate, an imine, an oxime or sulfite. The use of a phenol, an oxime, a lactam, an imine or the like blocking agent, among others, is advantageous. Practical examples of the blocking agent are as follows:

Phenols:

Phenol, cresol, xylenol, nitrophenol, chlorophenol, ethylphenol, p-hydroxydiphenol, t-butylphenol, o-isopropylphenol, o-sec-butylphenol, p-nonylphenol, p-t-octylphenol, hydroxybenzoic acid, hydroxybenzoic acid esters, etc.;

Lactams:

ε-Caprolactam, δ-valerolactam, γ-butyrolactam, β-propiolactam, etc.;

Active methylene compounds:

Diethyl malonate, dimethyl malonate, ethyl acetoacetate, methyl acetoacetate, acetylacetone, etc.;

Alcohols:

Methanol, ethanol, n-propyl alcohol, isopropyl alcohol, n-butyl alcohol, isobutyl alcohol, t-butyl alcohol, n-amyl alcohol, t-amyl alcohol, lauryl alcohol, ethylene glycol monomethyl ether, ethylene glycol monoethyl ether, ethylene glycol monobutyl ether, diethylene glycol monomethyl ether, diethylene glycol monoethyl ether, propoylene glycol monomethyl ether, benzyl alcohol, methoxymethanol, glycolic acid, methyl glycolate, ethyl glycolate, butyl glycolate, other glycolates, lactic acid, methyl lactate, ethyl lactate, butyl lactate, other lactic acid ester, methylolurea, methylolmelamine, diacetone alcohol, ethylene chlorohydrin, ethylene bromohydrin, 1,3-dichloro-2-propanol, ω-hydroperfluoroalcohol, acetone cyanohydrin, etc.;

Mercaptans:

Butyl mercaptan, hexyl mercaptan, t-butyl mercaptan, t-dodecyl mercaptan, 2-mercaptobenzothiazole, thiophenol, methylthiophenol, ethylthiophenol, etc.;

Acid amides:

Acetanilide, acetanisidide, acetotoluidide, acrylamide, methacrylamide, acetamide, stearic acid amide, benzamide, etc.;

Imides:

Succinimide, phthalimide, maleimide, etc.;

Amines:

Diphenylamine, phenylnaphthylamine, xylidine, N-phenylxylidine, carbazole, aniline, naphthylamine, butylamine, dibutylamine, butylphenylamine, etc.;

Imidazoles:

Imidazole, 2-ethylimidazole, etc.;

Ureas:

Urea, thiourea, ethyleneurea, ethylenethiourea, 1,3-diphenylurea, etc.;

Carbamates:

Phenyl N-phenylcarbamate, 2-oxazolidone, etc.;

Imines:

Ethyleneimine, propyleneimine, etc.;

Oximes:

Formamidoxime, acetaldoxime, acetoxime, methyl ethyl ketoxime, diacetyl monoxime, benzophenone oxime, cyclohexanone oxime, etc.;

Sulfites:

Sodium bisulfite, potassium bisulfite, etc.

According to a typical method of reacting the above-mentioned monomeric isocyanate or a prepolymer therefrom, the monomeric isocyanate or prepolymer is reacted with the blocking agent in an equivalent ratio between the NCO group and the active hydrogen in the blocking agent of about 0.9 to 1.0, preferably about 0.95 to 1.0; or the monomeric isocyanate is reacted with the blocking agent in an equivalent ratio between the NCO group and the active hydrogen in the blocking agent of about 1.1 to 3.0, preferably about 1.2 to 2.0 and the reaction product is further reacted with a low-molecular-weight or high-molecular-weight polyol such as mentioned above in relation to prepolymer production, water or a low molecular amine; or the monomeric isocyanate is reacted with a low-molecular-weight or high-molecular-weight polyol, water or a low molecular amine in an NCO group/active hydrogen equivalent ratio of about 1.5 to 10.0, preferably about 2.0 to 7.0, and the reaction product is then reacted with the blocking agent.

In each case, the reaction is carried out by a known method in the presence or absence of a solvent having no active hydrogen atoms (e.g. an aromatic solvent, such as benzene, toluene, xylene, etc., a petroleum solvent, such as Solvesso 100 or Solvesso 200, an ester, such as ethyl acetate or butyl acetate, a ketone, such as acetone, methyl ethyl ketone, methyl isobutyl ketone or cyclohexanone, an ether, such as tetrahydrofuran). In carrying out the reaction, a known catalyst, such as tertiary amine or an organometal, may be used.

The one-can heat-curable resin composition of this invention is a composition containing an adduct of the above-mentioned polyester polyol and epoxy resin with one or more kinds of an alkanol amine and a monovalent phenol and the blocked product thereof.

The ratio between the polyols and the blocked product is preferably about ½ to 2/1, more preferably about 1/0.8 to 1/1.2, in terms of the OH group/regenerated NCO group equivalent ratio.

The composition of this invention can be used as it is as a clear coating material or an adhesive, for instance. The composition may further contain, when desired, other components than the above-mentioned polyols and blocked products, for example, an organic solvent, such as an ester (e.g. ethyl acetate, butyl acetate, methyl acetoacetate, 2-ethoxyethyl acetate, etc.), an aromatic one (e.g. xylene, toluene, etc.), a ketone (e.g. methyl ethyl ketone, methyl isobutyl ketone, cyclohexanone, etc.), an ether (e.g. diethylene glycol dimethyl ether, etc.) or a petroleum solvent (e.g. Solvesso 100, Solvesso 200, etc.), a color pigment, an extender pigment, a dispersing agent of the silicone, amine, polyether, polyester, castor oil, synthetic wax or bentonite type, for instance, a defoaming agent, a levelling agent, a thixotropic agent, a stabilizer of the benzotriazole, hindered amine or hindered phenol type, for instance, and a reaction catalyst, such as a tin-, lead-, zinc- or iron-based one.

The one-can heat-curable resin composition of this invention as obtained in the above manner, when applied to a substrate and then heated, gives a cured coat film as a result of NCO regeneration due to dissociative elimination of the blocking agent form blocked product, followed by reaction of the regenerated NCO groups with the OH groups in the polyols.

The resin composition of this invention is advantageously used in the production of precoated metal in particular, although it is also usable as a coating material or an adhesive.

Generally, the metal plates to be used in the production of precoated metal may be of any kind suited for precoated metal production, for example cold-rolled steel plates, galvanized steel plates, galvanealed steel plate, galvanized alloy plates, tinned steel plates, chrome-plated steel plates, aluminum-plated steel plates, lead-plated steel plates, nickel-plated steel plates, tin free steel plate, aluminum plates, titanium plates, stainless steel plates, etc. The resin composition of this invention is applied to these plates either directly or after ordinary pretreatment of said plates. In either case, the resin composition of this invention can be applied to the plates after application of a primer, depending on necessity, with or without the subsequent drying of the primer. The pretreatment is, for example, chromating, phosphating, or composite oxide coat layer formation treatment. The chromating treatment includes electric chromating, chromate coating, and reactive chromating treatment. The phosphating treatment includes zinc phosphate treatment and iron phosphate treatment. The composite oxide coat formation treatment includes nickel- and cobalt-containing oxide formation.

The primer may be a conventional one as exemplified by an epoxy resin or macromolecular polyester type one.

The metal plates any take any form, for example, a flat plate or cylindrical one. To these metal plates is applied the resin composition of this invention. The spread or coating amount is not critical but may be optional. However, the film thickness after drying should preferably be 10 to 30 micrometers.

As the means of application, there may be mentioned a spray gun, a roller coater and a flow coater, among others.

The coated metal plates are then heated for curing.

The heating temperature may vary depending on the kind of blocking agent and other factors but generally is about 150° to 350° C. The heating time is preferably about 20 to 120 seconds. This heating operation results in dissociative elimination of the blocking agent from the blocked product to regenerate the NCO groups, followed by crosslinking reaction of the regenerated NCO groups with the OH groups of the polyols to give a tough and durable film.

The coated film obtained by curing the one-can heat-curable resin composition according to this invention shows no yellowing or thermal degradation due to heating at all. Furthermore, said film is excellent in chemical resistance, stain resistance and especially in mustard staining resistance, and has a high hardness and good processability. Especially, the composition of this invention, when used in the production of precoated metal, gives good coated plates, which can be advantageously used in manufacturing household electric appliances and so on.

The following reference examples and working examples illustrate the invention in further detail. In the examples, "part(s)" or "%" means "part(s) by weight" or "% by weight", respectively.

REFERENCE EXAMPLE 1

A reaction vessel was charged with Epotohto ST-3000 (manufactured by Toto Kasei KK, hydrogenated bisphenol A type epoxy resin, epoxy equivalent =234.5, viscosity (25° C.)=3400 cps)(301.4 parts), which was heated while stirring under the atmosphere of nitrogen gas. When the inner temperature reached 155° C., diethanolamine (148.6 parts) was added dropwise using a dropping funnel taking about 2 hours, followed by maintaining the inner temperature in a range from 150° to 160° C. for about 1 hour. The reaction mixture was then cooled, and the reaction product was taken out. The hydroxyl value of this polyol was 516.0.

REFERENCE EXAMPLE 2

A reaction vessel was charged with 400.0 parts of Epotohto YD-904 (manufactured by Toto Kasei KK, bisphenol A type epoxy resin, epoxy equivalent=941.4, softening point=104.5° C.), which was heated in the atmosphere of nitrogen gas. When the inner temperature reached 140° C., the material became a homogeneous solution. The solution was further heated while stirring. When the inner temperature reached 150° C., diethanolamine (60.0 parts) was added dropwise using a dropping funnel taking about one hour, and the reaction was allowed to proceed. After the dropwise addition, the reaction mixture was maintained at temperatures ranging from 150° C. to 160° C. for about 2 hours, followed by cooling and taking out the reaction product. The hydroxyl value of this polyol was 313.1.

REFERENCE EXAMPLE 3

A reaction vessel was charged with hydrogenated bisphenol A [364.9 parts(1.52 mol.)] and adipic acid [441.6 parts(3.02 mol.)], and the reaction was allowed to proceed at 220° C. while nitrogen gas was blown into the vessel and the water resulting from the condensation reaction was distilled off. When an acid value of 250.0 was attained, trimethylolpropane (hereinafter referred to as "TMP") [304.1 parts(2.27 mol.)] was added. The reaction was allowed to proceed in the same manner while the condensation water was distilled off. A polyester polyol having five functional groups, with an acid value of 2.6, a hydroxyl value of 187.2 and a number-average molecular weight of 1,478, was thus obtained. This polyester polyol (600 parts) and 666.7 parts of Epomik VU-458CT-60 [manufactured by Mitsui Petrochemical Industries, Ltd., diethanolamine and diisopropanolamine adduct, of bisphenol A type epoxy resin, solid content; 60.0%, viscosity (25° C.); 2900 cps, hydroxyl value; 132.0, solvent; a mixture of cellosolve acetate and toluene] were dissolved in 733.3 parts of cyclohexane to give a solution having a solid content of 50%. Some characteristic properties of this solution are shown in Table 1.

REFERENCE EXAMPLE 4

A reaction vessel was charged with 1,4-butanediol [236.7 parts(2.63 mol.)] and succinic acid [614.1 parts (5.20 mol.)]. The reaction was allowed to proceed at 220° C. while nitrogen gas was blown into the vessel and the water resulting from the condensation reaction was distilled off. When an acid value of 356.5 was attained, 523.3 parts(3.90 mol.) of TMP was added. The reaction was allowed to proceed in the same manner while the condensation water was distilled off. A polyester polyol having five functional groups, with an acid value of 5.7, a hydroxyl value of 281.5 and a number-average molecular weight of 977, was obtained. This polyester polyol (600 parts) and 666.7 parts of the Epomik VU-458CT-60 employed in Reference Example 3 were dissolved in 733.3 parts of cyclohexane to give a solution having a solid content of 50%. Some characteristic properties of this solution are shown in Table 1.

REFERENCE EXAMPLE 5

A reaction vessel was charged with cyclohexane dimethanol [320 parts(2.22 mol.)] and 3,6-endo-methylene-1,2,3,6-tetrahydro-cis-phthalic anhydride [722.5 parts(4.40 mol.)], into which was blown nitrogen gas, followed by heating. After the inner temperature reached 150° C., the reaction was allowed to proceed for one hour. When the acid value reached 207.0, TMP [445.0 parts(3.32 mol.)] was added, then the reaction was allowed to proceed while distilling off the condensation water to obtain a polyester polyol having five functional groups, with an acid value of 5.5, hydroxyl value of 207.6 and a number-average molecular weight of 1,316. This polyester polyol (600 parts) and 666.7 parts of Epomik VU-458CT-60 employed in Reference Example 3 were dissolved in cyclohexanone (733.3 parts) to give a solution having a solid content of 50%.

Some of the characteristic properties of this solution are shown in Table 1.

REFERENCE EXAMPLE 6

A reaction vessel was charged with 1,6-hexanediol [205.8 parts(1.74 mol.)], dimethyl isophthalate [670.1 parts(3.45 mol.)] and zinc acetate (0.1 g), and the reaction was allowed to proceed at 220° C. while nitrogen gas was blown into the vessel and the by-product methanol was distilled off. After removal of 121 ml of methanol, 347.2 parts(2.59 mol.) of TMP was added, and the reaction was allowed to proceed in the same manner while methanol was distilled off to give a polyester polyol having five functional groups, with an acid value of 1.4, a hydroxyl value of 193.6, a number-average molecular weight of 1,438. This polyester polyol (600 parts) and 666.7 parts of Epomik VU-458CT-60 employed in Reference Example 3 were dissolved in cyclohexanone (733.3 parts) to give a solution having a solid content of 50%. Some of the characteristic properties of this solution are shown in Table 1.

REFERENCE EXAMPLE 7

In cyclohexanone (200.0 parts) were dissolved 120.0 parts of polyester polyol obtained in Reference Example 5 and 80.0 parts of polyol obtained in Reference Example 1 to give a solution having a solid content of 50%. Some of the characteristic properties of this solution are shown in Table 1.

REFERENCE EXAMPLE 8

In 200.0 parts of cyclohexanone were dissolved 120.0 parts of polyester polyol obtained in Reference Example 6 and 80.0 parts of polyol obtained in Reference Example 1 to give a solution having a solid content of 50%. Some of the characteristic properties of this solution are shown in Table 1.

REFERENCE EXAMPLE 9

A reaction vessel was charged with trimethylol propane [724.5 parts(5.40 mol.)], dimethyl terephthalate [699.1 parts(3.60 mol.)] and zinc acetate [0.34 parts], and the reaction was allowed to proceed at 220° C. while nitrogen gas was blown into the vessel and the by-product methanol was distilled off to give a polyester poly having five functional groups, with an acid value of 0.2, a hydroxyl value of 403.0 and a number-average molecular weight of 696. This polyester polyol (120.0 parts) and 80.0 parts of the same polyol as obtained in Reference Example 2 were dissolved in 200.0 parts of cyclohexanone to give a solution having a solid content of 50%. Some of the characteristic properties of this solution are shown in Table 1.

REFERENCE EXAMPLE 10

In 200.0 parts of cyclohexanone were dissolved 120.0 parts of the polyester polyol obtained in Reference Example 6 and 80.0 parts of the poly obtained in Reference Example 2 to give a solution having a solid content of 50%. Some of the characteristic properties of this solution are shown in Table 1.

REFERENCE EXAMPLE 11

In 200.0 parts of cyclohexanone were dissolved 120.0 parts of the polyester poly obtained in Reference Example 6 and 80.0 parts of Epomik U-407 [manufactured by Mitsui Petrochemical Industries, Ltd., isobutyl phenol adduct of bisphenol A type epoxy resin, softening point; 116° C., hydroxyl value; 190.0] to give a solution having a solid content of 50%. Some of the characteristic properties are shown in Table 1.

REFERENCE EXAMPLE 12

A reaction vessel was charged with 785.3 parts of Takenate D-120N [manufactured by Takeda Chemical Industries, Ltd., TMP-1,3-bis(isocyanatomethyl)cyclohexane adduct, solid content 75%, isocyanato group content 11.7%, solvent; ethyl acetate] and 319.9 parts of cellosolve acetate. While the inner temperature was maintained at 60° to 70° C. in a nitrogen gas atmosphere, 194.9 parts of methyl ethyl ketoxime was added dropwise gradually. After completion of the addition, the above temperature range was maintained for about 2 hours to give a blocked product solution with a solid content of 60%, a regenerated isocyanato group content of 7.09%, a 25° C. Gardner-Holdt viscosity and $Z_1$ to $Z_2$. Some of the characteristic properties of this solution are shown in Table 2.

REFERENCE EXAMPLE 13

A reaction vessel was charged with 760.7 parts of Takenate D-160N [manufactured by Takeda Chemical Industries, Ltd., TMP-hexamethylene diisocyanate adduct, solid content 75%, isocyanato group content 13.2%, Gardner-Holdt viscosity (25° C.) J to K] and 325.6 parts of cellosolve acetate. While the inner temperature was maintained at 60° to 70° C. in a nitrogen gas atmosphere, 213.7 parts of methyl ethyl ketoxime was added dropwise slowly. After completion of the addition, the above temperature range was maintained for about 2 hours to give a blocked product solution with a solid content of 60%, a regenerated isocyanato group content of 7.77% and Gardner-Holdt viscosity (25° C.) of Q-R. Some of the characteristic properties of this solution are shown in Table 2.

REFERENCE EXAMPLE 14

In cyclohexanone (191.7 parts) was dissolved 1,3-bis(isocyanatomethyl)cyclohexane (164.1 parts). While the temperature was maintained at a range from 75° C. to 80° C., methyl ethyl ketoxime (122.7 parts) was added dropwise taking one hour. After completion of the addition, the above temperature range was maintained for an additional one hour. To the reaction mixture were added 1,1,3,3-tetra n-butyl-1,3-diacetoxydistannoxane (0.36 parts) and 120.7 parts of Epomik VU-455CT-60 [manufactured by Mitsui Petrochemical Industries, Ltd. an adduct of diethanolamine and diisopropanol amine to bisphenol A type epoxy resin, a solid content of 60%, viscosity (25 C.); 5700 cps, hydroxyl value; 144.0, solvent; a mixture of cellosolve acetate and toluene]. The reaction was allowed to proceed at 75 to 80 C. for 4 hours to give a blocked product solution with a regenerated isocyanato group content of 9.86% and a solid content of 60%. Some of the characteristic properties of this solution are shown in Table 2.

REFERENCE EXAMPLE 15

In 303.3 parts of cyclohexanone was dissolved 116.5 parts of 1,3-bis(isocyanatomethyl)cyclohexane. While the temperature was maintained at a range from 75 C. to 80 C., methyl ethyl ketoxime (87.1 parts) was added taking one hour. After completion of the addition, the above temperature range was maintained for further one hour. To the reaction mixture were added 1,1,3,3-tetra-n-butyl-1,3-diacetoxydistannoxane (0.31 parts) and 99.0 parts of Placcel G-402 [manufactured by Daicel Chemical Industries, Ltd. an ε-caprolactone adduct of bisphenol A type epoxy resin to epoxy equivalent; 1250, hdyroxyl value; 119.0], and the reaction was allowed to proceed for 3 hours at a temperature range from 75° C. to 80° C. to give a blocked product solution with a regenerated isocyanato group content of 6.93% and a solid content of 50%. Some of the characteristic properties are shown in Table 2.

REFERENCE EXAMPLE 16

In 299.7 parts of cyclohexanone was dissolved 116.5 parts of 1,3-bis(isocyanatomethyl)cyclohexane, to which was added dropwise 87.1 parts of methyl ethyl ketoxime taking one hour, while the temperature was maintained at a range of 75° C. to 80° C. After completion of the addition, the above temperature range was maintained for an additional one hour. To the reaction mixture were then added 0.31 parts of 1,1,3,3-tetra-n-butyl-1,3-diacetoxydistannoxane and 95.5 parts of Epikote 1001 [manufacture by Yuka Shell Epoxy k.k, bisphenol A type epoxy resin, epoxy equivalent; 470], and the reaction was allowed to proceed for 4 hours at a temperature range from 75° to 80° C. to give a a blocked product solution with a regenerated isocyanato group content of 7.01% and a solid content of 50%. Some of the characteristic properties of this solution are shown in Table 2.

REFERENCE EXAMPLE 17

A 2-liter four-necked flask equipped with a stirrer, a thermometer, a nitrogen gas inlet tube and a reflux condenser was charged with 500 parts of a TMP-$\alpha,\alpha,\alpha'$-,$\alpha'$-tetramethyl-m-xylylene diisocyanate adduct (solid at room temperature; isocyanato content 13.3%), 427.1 parts of ethyl acetate and 0.19 parts of 1,1,3,3-tetra-n-butyl-1,3-diacetoxydistannoxane. While the contents were maintained at 60° to 70° C. in a nitrogen gas atmosphere, 140.5 parts of methyl ethyl ketoxime was added dropwise slowly. After completion of the addition, the resultant mixture was maintained at the above temperature range for about 4 hours to give a blocked product solution with a solid content of 60%, a regenerated isocyanato group content of 6.20% and a Gardner-Holdt viscosity (25° C.) of Q-R. Some characteristic properties of this solution are shown in Table 2.

REFERENCE EXAMPLE 18

In a mixture solvent of 198.2 parts of toluene and 198.2 parts of cyclohexanone was dissolved 262.4 parts of 4,4'-methylenebis(cyclohexyl isocyanate). To the solution was added dropwise 87.1 parts of methyl ethyl ketoxime taking 30 minutes. After completion of the addition, the mixture was heated at a temperature range from 75° to 80° C. for an additional one hour. To the resultant mixture were added 0.19 parts of 1,1,3,3-tetra-n-butyl-1,3-diacetoxydistannoxane and 46.1 parts of TMP, and the reaction was allowed to proceed for 4 hours at a temperature range from 75° to 80° C. to give a blocked product solution with a regenerated isocyanato group content of 5.30% and a solid content of 50%. Some of the characteristic properties of this solution are shown in Table 2.

WORKING EXAMPLE 1

A reaction vessel was charged with 15.56 parts of the polyol solution obtained in Reference Example 3 and 16.45 parts of the blocked product solution obtained in Reference Example 12 (NCO/OH equivalent ratio=1.0). Then, 17.65 parts of titanium oxide (Tipaque R-820; Ishihara Sangyo Kaisha Ltd.) was added so that the pigment weight concentration (PWC) amounted to 50%. As the catalyst, 1,1,3,3-tetra-n-butyl-1,3-diacetoxydistannoxane 0.017 part) and 0.15 part of BYK-300 (BYK-Mallinckrodt, Inc.) were further added, and the resultant mixture was kneaded sufficiently by means of a paint conditioner to give a white enamel solution. A galvanized steel plate of 0.6 mm in thickness was subjected to electrolytic chromate treatment, to which was applied an epoxy resin primer to a dry film thickness of 5$\mu$, followed by baking. Onto thus treated steel plate was applied the white enamel solution with a bar coater to a dry film thickness of 20$\mu$, followed by baking in the atmosphere of 260° C. for 60 seconds to give a glossy white coat film. The composition of the white enamel and some performance characteristics of the coat film are shown in Table 3.

WORKING EXAMPLES 2 TO 11

Using blocked products obtained in Reference Examples 12 to 18, compositions, in which the total volume of white enamel solution of PWC=50% was 50 parts as shown in Table 3, were subjected to baking under the same conditions as in Example 1.

TABLE 1

| | | Reference Example | | | | | | | | |
|---|---|---|---|---|---|---|---|---|---|---|
| | Polyol | 3 | 4 | 5 | 6 | 7 | 8 | 9 | 10 | 11 |
| Ratio in polyol (%) | Polyester polyol | 30.0 | 30.0 | 30.0 | 30.0 | 30 | 30 | 30 | 30 | 30 |
| | Polyol Epomik VU-458CT-60 | 33.3 | 33.3 | 33.3 | 33.3 | | | | | |
| | using Resin of Reference Example 1 | | | | | 20 | 20 | | | |
| | epoxy Resin of Reference Example 2 | | | | | | | 20 | 20 | |
| | resin Epomik U-407 | | | | | | | | | 20 |
| | Cyclohexanone | 36.7 | 36.7 | 36.7 | 36.7 | 50 | 50 | 50 | 50 | 50 |
| Properties of resin solution | Non-volatile content (%) | 50 | 50 | 50 | 50 | 50 | 50 | 50 | 50 | 50 |
| | Acid value | 0.8 | 1.7 | 1.7 | 0.4 | 1.7 | 0.4 | 0.1 | 0.4 | 0.4 |
| | Hydroxyl value | 100.1 | 128.4 | 106.2 | 102.0 | 165.5 | 161.3 | 183.5 | 120.7 | 96.1 |
| | Gardner-Holdt Viscosity (25° C.) | U-V | K-L | Y Z | X | W-X | W | Y-Z | $Z_1$ | $Z_1$-$Z_2$ |

TABLE 2

| | | Reference Example | | | | | | |
|---|---|---|---|---|---|---|---|---|
| | Blocked Product | 12 | 13 | 14 | 15 | 16 | 17 | 18 |
| Properties of Resin Solution | Non-volatile content (%) | 60 | 60 | 60 | 50 | 50 | 60 | 50 |
| | Gardner-Holdt viscosity (25° C.) | $Z_1$-$Z_2$ | Q-R | $Z_2$ | U-V | H | Q-R | $Z_2$-$Z_3$ |
| | Regenerated isocyanato | 7.09 | 7.77 | 9.86 | 6.93 | 7.01 | 6.20 | 5.30 |

TABLE 2-continued

| Blocked Product | Reference Example | | | | | | |
|---|---|---|---|---|---|---|---|
| | 12 | 13 | 14 | 15 | 16 | 17 | 18 |
| group content (%) | | | | | | | |

TABLE 3

| | Working Example | | | | | | | | | | |
|---|---|---|---|---|---|---|---|---|---|---|---|
| | 1 | 2 | 3 | 4 | 5 | 6 | 7 | 8 | 9 | 10 | 11 |
| Formulation of White Enamel | | | | | | | | | | | |
| Kinds of polyol (Ref. Ex. No.) | 3 | 4 | 5 | 6 | 6 | 6 | 7 | 8 | 9 | 10 | 10 |
| Amount of polyol (parts) | 15.56 | 13.52 | 15.82 | 18.13 | 15.76 | 15.85 | 10.56 | 10.09 | 11.09 | 12.24 | 18.62 |
| Blocked Products (Ref. Ex. No.) | 12 | 12 | 13 | 14 | 15 | 16 | 17 | 18 | 15 | 18 | 14 |
| Amount of blocked product (parts) | 16.45 | 18.34 | 16.20 | 14.05 | 17.37 | 17.27 | 21.11 | 23.00 | 22.00 | 20.87 | 13.60 |
| Amount of TiO$_2$ used (parts) | 17.65 | 17.77 | 17.63 | 17.50 | 16.56 | 16.56 | 17.94 | 16.55 | 16.55 | 16.55 | 17.47 |
| Amount of 1,1,3,3-tetra-n-butyl 1,3-diacetoxydistannoxane added (parts) | 0.017 | 0.018 | 0.017 | 0.014 | 0.015 | 0.015 | 0.022 | 0.020 | 0.019 | 0.018 | 0.014 |
| Amount of BYK-300 added (parts) | 0.15 | 0.15 | 0.15 | 0.15 | 0.14 | 0.14 | 0.15 | 0.14 | 0.14 | 0.14 | 0.15 |
| Film Performance | | | | | | | | | | | |
| **Pencil hardness*$^1$** | | | | | | | | | | | |
| Scar method | 2H | 2H | 3H | 2H | H | H | H | 3H | 2H | 3H | 3H |
| JIS method | 4H | 4H | 4H | 4H | 4H | 4H | 4H | 4H | 4H | 4H | 4H |
| Erichsen Test (7 mm extrusion)*$^2$ | 100/100 | 100/100 | 100/100 | 100/100 | 100/100 | 100/100 | 95/100 | 98/100 | 100/100 | 100/100 | 98/100 |
| Stain resistance | | | | | | | | | | | |
| Felt pen: Black*$^3$ | ⊚ | ⊚ | ⊚-○ | ⊚ | ⊚ | ⊚ | ⊚ | ○ | ⊚ | ⊚-○ | ⊚ |
| Felt pen: Red*$^3$ | ⊚ | ⊚ | ○ | ⊚ | ○ | ⊚ | ⊚ | ○ | ⊚ | ○ | ⊚ |
| Mustard stain resistance (ΔE)*$^4$ | 0.85 | 1.52 | 2.11 | 0.47 | 0.35 | 0.55 | 0.72 | 0.43 | 0.36 | 0.48 | 0.32 |
| Mustard stain resistance (5 cycles)*$^5$ | ○-Δ | ○Δ | Δ | ○ | ○ | ○ | ○-Δ | ○ | ○ | ○ | ○ |
| Solvent tolerance Xylene rubbing (50 times)*$^6$ | Passed | Passed | Passed | Passed | Passed | Passed | Passed | Passed | Passed | Passed | Passed |
| Chemical resistance | | | | | | | | | | | |
| Alkali resistance*$^7$ | good | good | good | good | good | good | good | good | good | good | good |
| Acid resistance*$^8$ | good | good | good | good | good | good | good | good | good | good | good |

Evaluation methods
*$^1$Pencil hardness:
Scar method: In accordance with the method of JIS-K-5400, a pencil is moved horizontally on the surface of the film. The surface is wiped with a wad of sanitary cotton. The result is expressed in the hardness of the pencil which left no scar on the film surface.
JIS method: Based on JIS-K-5400
*$^2$Erichsen test: In accordance with JIS-K-5400, the coated surface of each test piece is scored with a knife in a checkerboard pattern of 100 squares. After the test piece is pushed out by means of a Erichsen testing apparatus with a die and punch from the reverse side over a distance of 7 mm in the center of the checkerboard pattern, the coat is peeled off with a cellophane tape. Where no exfoliation is found at all, the result is expressed as 100/100; where all the squared are peeled off, the result is expressed as 0/100.
*$^3$Stain resistance: With a felt pen lines are drawn the surface of the test film, which is left standing for 24 hours. The lines are wiped with a wad of sanitary cotton saturated with ethanol. The trace of the lines is examined for evaluation. ⊚ no trace ○ slightly traced Δ traced to some extent x apparent trace
*$^4$Mustard staining resistance (ΔE): A commercially available mustard paste (60 parts) is dispersed thoroughly in 100 parts of water. The precoated metal plate specimen is immersed in this dispersion at room temperature. After 24 hours of immersion, the specimen is taken out, washed well with water and color differences on the respective surfaces are measured.
*$^5$Cyclic mustard staining resistance (5 cycles): A commercially available mustard is applied onto the surface of precoated metal plate specimen, which is left standing at 60 ± 2° C. and a humidity of 91 ± 3% for 8 hours, then for 16 hours at ambient temperatures. This procedure is repeated 5 times, followed by wiping off the mustard from the surface. Then the state of the surface is evaluated macroscopically. Indistinct yellow staining; ○ Slight yellow staining; Δ Distinct yellow staining.; x Yellow staining
*$^6$Xylene rubbing: The coat film surface is rubbed with a xylene-impregnated cloth under a constant load. One reciprocation of the cloth is counted as one rubbing. The solvent resistance is evaluated depending on whether 50 rubbings result in coat film surface damage.
*$^7$Alkali resistance: The end of the coated plate is sealed with wax, which is immersed in a 5% aqueous solution of NaOH for 72 hours. The test piece is taken out of the aqueous solution, and the appearance of the surface is examined macroscopically.
*$^8$Acid resistance: The end of the coated plate is sealed with wax, which is immersed in a 5% aqueous solution of HCl for 72 hours. The test piece is then taken out of the solution, and the appearance of the surface is examined macroscopically.

What is claimed is:

1. A one-can heat-curable resin composition which comprises: (1) a polyester polyol having at least three functional groups; (2) an adduct of an epoxy resin with at least one member selected from the group consisting of an alkanol amine and a monovalent phenol; and (3) a blocked organic polyisocyanate or a product of blocking of a prepolymer having terminal NCO groups obtained by reaction of an organic polyisocyanate with an active hydrogen-containing compound.

2. The composition as claimed in claim 1, wherein the amount of the component (2) is about 10 to 70 weight % on the polyol components basis.

3. The composition as claimed in claim 1, wherein the ratio between the polyols (1) and (2) and the blocked product (3) is about ½ to 2/1 in terms of the OH group/regenerated NCO group equivalent ratio.

4. The composition as claimed in claim 1, wherein the adduct of an epoxy resin is one obtained by reaction of an epoxy resin of the general formula:

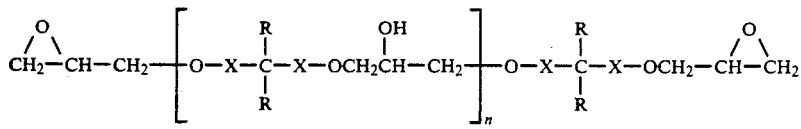

wherein X stands for a phenylene or cyclohexylene group, which may optionally be substituted with halogen; R stands for H or methyl group and n denotes 0 to 12.0
with a dialkanolamine.

5. The composition as claimed in claim 1, wherein the hydroxyl value of the adduct of an epoxy resin ranges from about 100 to about 600.

6. The composition as claimed in claim 1, wherein the polyester polyol is one having 3 to 7 functional groups, a number average molecular weight of 600 to 3500 and a hydroxyl value of 80 to 460.

* * * * *